United States Patent Office 2,872,423
Patented Feb. 3, 1959

2,872,423

COMPOSITION COMPRISING A MIXTURE OF SYNTHETIC RESINS AND CELLULOSE ACETATE BUTYRATE FOR PRINTING ON VINYL PLASTICS

Gabriel F. Goldstein, New York, N. Y., assignor to Interchemical Corporation, New York, N. Y., a corporation of Ohio No Drawing. Application May 6, 1955
Serial No. 506,665

6 Claims. (Cl. 260—16)

This invention relates to printing compositions for printing on vinyl plastics, especially vinyl chloride and copolymers of vinyl chloride, and aims to provide compositions therefor which yield flexible, adherent and nontacky products which are resistant to normal cleaning procedures.

Printing on vinyl plastics is relatively new, and much of it has not reached commercial perfection. The vinyl plastics achieved rapid recognition because of their chemical inertness, toughness, and durability, and it is these properties which make printing upon them so difficult.

To be effective, printing compositions for vinyl plastics must have good adhesion, flexibility, and dry tack free. They must not cause puckering of the plastic, must not string out in printing, and must dry hard and be resistant to crocking, whitening, abrasion and soap. Added to these are the standard requirements sometimes difficult to meet with conventional compositions for normal printing, of suitable viscosity, good coverage, lack of offensive odor, standing and running stability, and adaptability to conventional drying cycles. Such requirements for printing on smooth, resistant vinyl plastics are most difficult to meet.

I have overcome the above frustrating difficulties by formulating compositions in which the vehicles comprise a lower-alkyl methacrylate modified alkyd resin in admixture with a vinyl chloride-acetate copolymer, as the binder for the pigment. Such printing compositions are disclosed and claimed in my application Serial No. 293,198, filed July 12, 1952, and in general, comprise pigmented water-in-oil emulsions with the binder dissolved in the oil phase.

One difficulty which is not completely overcome by the invention described in Serial No. 293,198 is blocking. The term "blocking" refers to the tendency of the printed vinyl sheets or films to stick to each other, either to another printed vinyl surface or to an unprinted surface. This sticking, or blocking, may result in a transfer or offsetting of spots of the print. I have now discovered that blocking can be greatly alleviated by including low viscosity cellulose acetate butyrate in the printing compositions of Serial No. 293,198, or compositions similar to those of Serial No. 293,198, except that the alkyd resin component is not included. The compositions of my present invention therefore comprise compositions in which the vehicles contain a vinyl-chloride vinyl-acetate resin, a lower alkyl methacrylate modified alkyd resin and low viscosity cellulose acetate butyrate or vehicles which contain a vinyl chloride-vinyl acetate resin, a lower alkyl methacrylate resin and low viscosity cellulose acetate butyrate.

In accordance with the teachings of the aforementioned application methacrylate-modified alkyd portion of the binder of my compositions is: (1) a copolymer of a lower alkyl methacrylate ester with a drying oil modified alkyd resin; or (2) a mixture of a lower alkyl methacrylate ester resin with a drying oil modified alkyd resin.

By lower alkyl is meant an alkyl radical containing up to six carbon atoms, of which the methyl is preferred. And by a drying oil modified alkyd is meant the resinous products of reaction of polyhydric alcohol and polybasic acid in which some of the polybasic acid is substituted by acids of the drying type, such as dehydrated castor oil, soya oil, and linseed oil acids and the amount of such oil modification is preferably from 20 to 60% of the alkyd.

The methacrylate modified alkyds used are those which are prepared either by copolymerizing a drying oil modified alkyd resin with a lower alkyl methacrylate ester, or are prepared by mixing a drying oil modified alkyd with a lower alkyl methacrylate resin polymer. The copolymer may suitably be prepared by reacting a solution of drying oil modified alkyd, in a high aromatic petroleum hydrocarbon solvent, with a lower alkyl methacrylate in the presence of a solvent therefor, the reaction temperature being of the order of 230–260° F., the latter phase of which may be accelerated by the addition of a fractional percent of benzoyl peroxide, based on the total solids, and bodying to the desired viscosity.

While all copolymers and mixtures are useful, I prefer those having 25–40% methacrylate; higher proportions of alkyd than 75% tend to give tacky films while lower proportions of alkyd than 60% tend to give less stable emulsions.

I have found that the most generally useful binder in my compositions is one in which the amount of methacrylate-modified drying alkyd component exceeds that of the vinyl chloride-acetate component. The lower alkyl methacrylate resin or lower alkyl methacrylate modified alkyd resin amounts to from 3.6 to 22.5 parts by weight of the total composition.

In accordance with the present invention, I use a low viscosity, i. e. ½ second grade, cellulose acetate butyrate. The cellulose acetate butyrate contains 12–15% acetyl groups and 35–39% butyryl groups and has a viscosity of ½ second as determined by American Society for Testing Materials (ASTM) test D871–467. The cellulose acetate butyrate is used in an amount not greater than about 15% by weight of the total composition.

My printing compositions may be pigmented or unpigmented. The compositions comprise vinyl chloride-acetate copolymer, lower alkyd methacrylate polymer or lower alkyl methacrylate modified drying alkyd, and cellulose acetate butyrate dissolved in a volatile, water-immiscible, organic solvent in which water may be emulsified up to the maximum for a water-in-oil emulsion. However, the most generally useful emulsion printing compositions contain about 10–25% aqueous inner phase. Small quantities of emulsifying agents, such as morpholine oleate and the like which promote the formulation of water-in-oil emulsions, are frequently useful in the preparation of my emulsion compositions.

The vinyl chloride-acetate resins of my binders are the organic solvent soluble, film forming types, exemplified by the Vinylites, of which the 87% chloride, 13% acetate having an average Staudinger apparent molecular weight above 5,000 and the 89.5% chloride, 10.5% acetate having a molecular weight of 16,000 are preferred. The vinyl chloride-vinyl acetate copolymer amounts to from 4.2 to 11.4 parts by weight of the total composition.

My compositions can be applied by means of a planographic printing press, such as Waldron Surface Press. The print is dried and cured, as by festooning at 120° to 140° F. for five to ten minutes, or by exposure to about 250–300° F. for about twenty seconds.

The following typical examples are given to illustrate my invention, proportions being by weight.

Example A.—Alkyd-methacrylate copolymer

| | |
|---|---:|
| (1) 41.2% dehydrated castor oil modified glyceryl phthalate, 41.7% solution in high aromatic solvent naphtha, 310–365° F. boiling range | 2417 |
| (2) Methyl methacrylate monomer | 873 |
| (3) High aromatic solvent naphtha, 310–365° F. boiling range | 75 |
| (4) Benzoyl peroxide | 4 |

Ingredients 1 and 2 were heated to reflux, and ingredients 3 and 4 were added slowly. Refluxing was continued and held for "X" viscosity, i. e. 12.9 poises, the cooking time being 5 hours and the temperature rising to 270° F. Other alkyd-methacrylate copolymers are similarly prepared.

Example 1

| | |
|---|---:|
| Alkyd-methacrylate copolymer, 1.14 moles 41.2% dehydrated castor oil modified glyceryl phthalate to 1 mole methyl methacrylate | 22.5 |
| Vinyl resin, 87% vinyl chloride, 13% vinyl acetate, e. g. Vinylite VYHH | 8.7 |
| Cellulose acetate-butyrate, ½ sec. grade | 1.0 |
| High flash naphtha (high aromatic petroleum hydrocarbon solvent, boiling range 157–185° C.) | 22.6 |
| Methyl-ethyl ketone | 45.2 |
| | 100.0 |

Example 2

| | |
|---|---:|
| Alkyd-methacrylate copolymer of Example 1 | 22.5 |
| Vinyl resin, 89.5% vinyl chloride, 16,000 av. mol. weight (e. g. Vinylite VYNS) | 8.7 |
| Cellulose acetate butyrate | 4.0 |
| High flash naphtha | 21.6 |
| Methyl-ethyl ketone | 43.2 |
| | 100.0 |

Example 3

| | |
|---|---:|
| Alkyd-methacrylate copolymer of Example 1 | 22.5 |
| Vinyl resin, of Example 2 | 11.4 |
| Cellulose acetate butyrate | 15.0 |
| Plasticizer | 4.6 |
| High flash naphtha | 15.5 |
| Methyl-ethyl ketone | 31.0 |
| | 100.0 |

Example 4

| | |
|---|---:|
| Alkyd-methacrylate copolymer of Example 1 | 8.0 |
| Vinylite VYHH | 4.2 |
| Cellulose acetate butyrate | 4.0 |
| Calcium carbonate | 18.0 |
| Wachung Red | 4.2 |
| Morpholine oleate | 1.0 |
| Methyl isobutyl ketone | 20.4 |
| Solvesso 100 | 20.0 |
| Water | 20.0 |

The above ingredients are mixed to form a pigmented water-in-oil emulsion containing as the oil phase, pigment, including calcium carbonate, dispersed in a solution of the Vinylite VYHH, alkyd-methacrylate copolymer and cellulose acetate butyrate in the volatile, water-immiscible organic solvents.

Example 5

| | |
|---|---:|
| Phthalocyanine blue | 4.2 |
| Calcium carbonate | 18.0 |
| Vinylite VYNS | 4.2 |
| Cellulose acetate butyrate | 4.0 |
| Alkyd-methacrylate copolymer of Example 1 | 8.0 |
| Methyl ethyl ketone | 53.6 |
| Solvesso 100 | 8.0 |

The above ingredients are mixed to form a pigmented composition in accordance with the invention by dispersing the pigments into the resins and cellulose acetate butyrate dissolved in the organic solvents.

Example 6

| | |
|---|---:|
| Methyl methacrylate resin | 3.6 |
| Vinylite VYNS 89.5% chloride, 10.5% acetate | 6.0 |
| Cellulose acetate butyrate | 1.0 |
| Methyl ethyl ketone | 89.4 |

The compositions, either the non-aqueous or the emulsion types, print well upon vinyl plastics and dry at 140° F. for 10 minutes or 250° F. for 20 seconds, or under other comparable conditions to give dry prints or overprints that are substantially non-blocking.

I claim:

1. A composition for printing on vinyl plastics, comprising a volatile, organic solvent solution of (A) from 4.2 to 11.4 parts by weight of the total composition of a vinyl chloride-vinyl acetate copolymer, (B) from 3.6 to 22.5 parts by weight of the total composition of a member of the group consisting of (1) lower alkyl methacrylate resin, (2) a mixture of a lower alkyl methacrylate resin in which the alkyl contains up to six carbon atoms with 20–60% drying oil modified alkyd resin wherein the drying oil modifier is selected from the group of acids of the drying type consisting of dehydrated castor oil, soya oil, and linseed oil acids, and (3) a copolymer of a lower alkyl methacrylate in which the alkyl group contains up to six carbon atoms with a 20 to 60% drying oil modified alkyd resin wherein the drying oil modifier is selected from the group of acids of the drying type consisting of dehydrated castor oil, soya oil, and linseed oil acids, and (C) ½ second cellulose acetate butyrate in an amount not greater than about 15% by weight of the total composition.

2. A composition as claimed in claim 1 wherein the vinyl chloride-vinyl acetate copolymer contains 87 to 89.5% vinyl chloride and 13 to 10.5% vinyl acetate.

3. A composition for printing on vinyl plastics, comprising a volatile, organic solvent solution of from 4.2 to 11.4 parts by weight of the total composition of a vinyl chloride-vinyl acetate copolymer, from 3.6 to 22.5 parts by weight of the total composition of a copolymer of a lower alkyl methacrylate in which the alkyl contains up to six carbon atoms with a 20 to 60% drying oil modified alkyd resin wherein the drying oil modifier is selected from the group of acids of the drying type consisting of dehydrated castor oil, soya oil, and linseed oil acids, and ½ second cellulose acetate butyrate in an amount not greater than about 15% by weight of the total composition.

4. Water-in-oil emulsion printing compositions for use in printing on vinyl plastics, the continuous phase of which comprises a volatile, water immiscible, organic solvent solution of (A) from 4.2 to 11.4 parts by weight of the total composition of a vinyl chloride-vinyl acetate copolymer, (B) from 3.6 to 22.5 parts by weight of the total composition of a member of the group consisting of (1) lower alkyl methacrylate, (2) a mixture of a lower alkyl methacrylate in which the alkyl contains up to six carbon atoms with a 20 to 60% drying oil modified alkyd wherein the drying oil modifier is selected from the group of acids of the drying type consisting of dehydrated castor oil, soya oil, and linseed oil acids, and (3) a copolymer of a lower alkyl methacrylate in which the alkyl group contains up to six carbon atoms with a 20 to 60% drying oil modified alkyd resin wherein the drying oil modifier is selected from the group of acids of the drying type consisting of dehydrated castor oil, soya oil, and linseed oil acids, and (C) ½ second cellulose acetate butyrate in an amount not greater than about 15% by weight of the total composition.

5. A composition as claimed in claim 4 wherein the vinyl chloride-vinyl acetate copolymer contains 87 to 89.5% vinyl chloride and 14 to 10.5% vinyl acetate.

6. A water-in-oil emulsion printing composition for use in printing on vinyl plastics, the continuous phase of which comprises a volatile, water immiscible, organic solvent solution of from 4.2 to 11.4 parts by weight of the total composition of a vinyl chloride-vinyl acetate copolymer, from 3.6 to 22.5 parts by weight of the total composition of a copolymer of a lower alkyl methacrylate in which the alkyl contains up to six carbon atoms with a 20 to 60% drying oil modified alkyd resin wherein the drying oil modifier is selected from the group of acids of the drying type consisting of dehydrated castor oil, soya oil, and linseed oil acids, and ½ second cellulose acetate butyrate in an amount not greater than 15% by weight of the total composition.

References Cited in the file of this patent

UNITED STATES PATENTS

| | | |
|---|---|---|
| 2,186,454 | Gloor | Jan. 9, 1940 |
| 2,708,188 | Goldstein | May 10, 1955 |

OTHER REFERENCES

Eastman Cellulose Esters, published by Tennessee Eastman Corporation, Kingsport, Tennessee, 1950, page 36.